March 8, 1966 R. C. FOLWEILER 3,239,323
METHOD FOR SEALING CERAMICS
Filed June 28, 1961
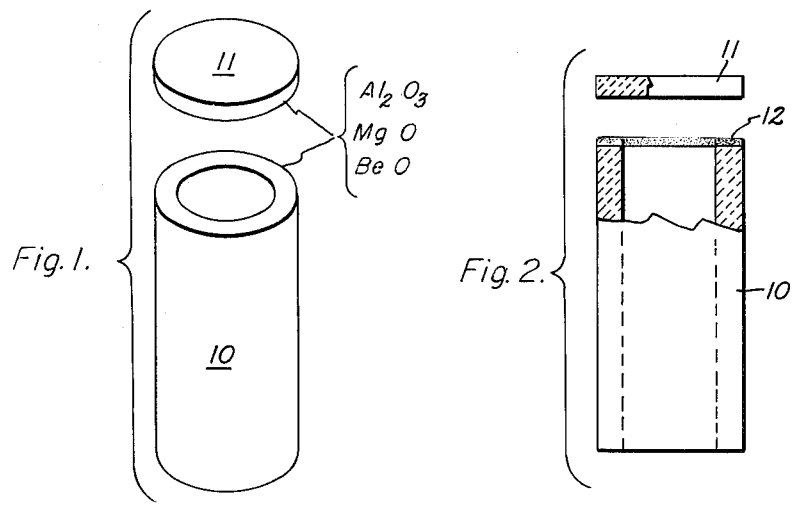
Fig. 1.
Fig. 2.
Fig. 3.
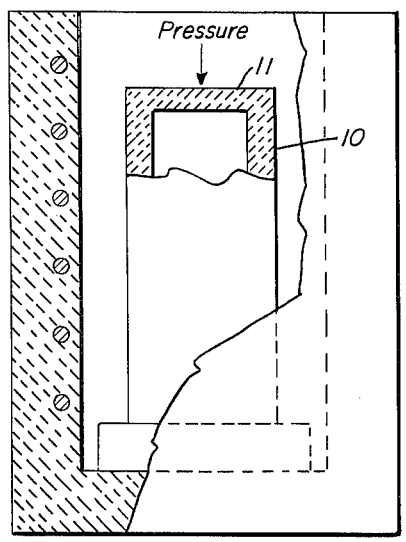
Inventor:
Robert C. Folweiler,
by Richard Q. Speer
His Attorney.

United States Patent Office 3,239,323
Patented Mar. 8, 1966

3,239,323
METHOD FOR SEALING CERAMICS
Robert C. Folweiler, Schenectady, N.Y., assignor to General Electric Company, a corporation of New York
Filed June 28, 1961, Ser. No. 120,203
2 Claims. (Cl. 65—32)

This invention relates to ceramic bodies and more particularly to improved processes for joining individual ceramic bodies into an integral unit.

The joining of ceramic parts to form strong integral assemblies has long been a problem in the electronics and other industries. Articles such as vacuum tubes, lamp envelopes and the like, for example, must have seals which are strong, be resistant to stress cracking due to thermal cycling and often be vacuum tight. Most present joints and seals are effected by metal closures joined to ceramic parts by procedures such as brazing, etc., and are limited in their ability to withstand cycling over large temperature ranges. This inability is due at least in part to the different coefficients of expansion between the ceramic and metal parts. Even when the coefficients of expansion have been approximately matched over limited temperature ranges, the problems encountered in adequately bonding dissimilar chemical materials have been major.

It is a principal object of this invention to provide a process for joining ceramic bodies into an integral unit having essentially the same composition throughout.

An additional object of this invention is to provide a process for joining ceramic bodies composed of aluminum oxide, magnesium oxide, beryllium oxide, or some combination thereof.

Other objects and advantages of this invention will be in part obvious and in part explained by reference to the accompanying specification and drawings.

In the drawings:

FIG. 1 is an exploded perspective of ceramic articles to be joined according to the process of this invention;

FIG. 2 is a side elevation, partly broken away, showing the position relationships between the ceramic pieces for effecting bonding; and FIG. 3 is a partially schematic side elevation illustrating the manner in which bonding is effected.

The process of this invention is generally one wherein suitably shaped ceramic bodies formed of aluminum oxide, magnesium oxide, beryllium oxide, or combinations thereof, are provided with mating surfaces enabling assembly of the individual parts into a final desired integral assembly.

The mating surfaces are placed in conjoint relationship, with a quantity of a ceramic powder having the same composition as that of the ceramic bodies being located at the juncture surface formed by the cooperating mating surfaces of the ceramic bodies. Pressure is then exerted against the bodies to compress the powder at the juncture surface, heat applied to effect initial bonding between them, and the entire assembly then fired at an elevated temperature for times sufficient to remove or close the pores in the powdered material and thereby form an integral bond between the separate parts. This bond is of the same composition as the original ceramic bodies so that the expansion characteristics are essentially identical.

Considering the application of the invention to some specific geometries, ceramic end closure disks can be joined to the open ends of tubing, for example, of the same composition by suitably shaping a quantity of alumina, beryllia, magnesia or combinations thereof into the preselected configurations. In the case being discussed, these configurations would, of course, be a cylindrical tube-like member 10 (FIG. 1) and a flat disk-like closure 11. Methods for producing these shapes include slip casting, powder compacting, extrusion, etc. For example, the tubular member can be produced by extruding a quantity of alumina, or one of the other oxides mentioned, to form a ceramic body having the elongated cylindrical shape, whereas the disk-like end closures can be formed by compacting a quantity of alumina in an ordinary double-acting die press. The tube should have the ends substantially flat to provide a surface which will mate with the flat surface of the disk-like end cap.

To join two such members together into an integral unit, either the cap or the tube can be coated with a thin but continuous layer of powder, such as indicated by numeral 12 in FIG. 2, of a composition corresponding generally to that of the members and the two parts then assembled in conjoint relationship, the area of contact between the plate and the tube defining a juncture surface.

As mentioned in the preceding paragraph, the powder coating should be thin but continuous to obtain optimum results. It has been found that the final thickness of the powder coating, that is, the thickness when the joining operation is complete, should be less than 0.01 inch. For the particular materials described in this application, this thickness would require an initial powder coating thickness of from about 50 to 100 mils. The coating should be as thin as possible, consistent with continuity thereof, to minimize radial shrinkage after the parts have been fired to effect the joining.

Following assembly of the individual ceramic parts, including the outer layer at the juncture surface, the pieces are subjected to a pressure such that the powder coating is subjected to compacting forces. The pressures are not particularly critical, normally being on the order of those just necessary to insure densification of the powder coating during initial firing. The initial firing is carried out at temperatures not less than about 1600° C. for times sufficient to fuse the powder coating and bond the ceramic bodies together into an integral unit. The firing can be carried out in a furnace 15, as shown in FIG. 3 of the drawings. FIG. 3 shows the application of pressure to urge parts 10 and 11 together during firing and also shows that the junction therebetween has become essentially indistinguishable from the individual pieces. It has been found that times of not less than about 10 minutes are necessary for this operation. Continued firing for times of from about 100 to 1000 minutes at temperatures of from about 1700° C. to 1900° C. are adequate to accomplish the joining and densification procedures. The atmosphere during the firing operation is generally one which is nonreactive to the materials being processed, although hydrogen having a dew point of not less than about −40° F. has been found to be particularly suitable for the materials described.

Considering a specific example, a tube composed essentially of alumina containing ¼ weight percent magnesia was prepared which had a ¼ inch outside diameter and a 1/32 inch wall thickness. This tube was produced by suitably mixing the two metal oxides in the proper proportions and extruding the loose material to form a green compact. The green compact was then fired in a dry hydrogen atmosphere (−60° F.) at 1900° C. for about 1000 minutes to effect densification thereof.

A flat disk having ¼ inch diameter was also prepared which had the same composition as the tube but this disk was prepared by compacting suitably mixed powders in a double-acting die at a pressure of 5 tons per square inch. This green piece was then fired at a temperature and for a time corresponding to that given in connection with the tube processing. The tube and the disk were then assembled after a coating of loose alumina powder also containing ¼ weight percent magnesia was applied to one surface of the closure disk. A pressure of 1000 pounds per square inch was then exerted against the end disk, forcing it tightly against the mating end of the tube. The entire assembly, with pressure still applied, was then heated in a furnace to a temperature of about 1600° C. and held at this temperature for about 10 minutes in air.

After cooling from 1600° C., the composite was fired at 1900° C. for 1000 minutes in hydrogen having a dew point of −60° F. After the assembly had been maintained at the operating temperature for the stated period of time, it was furnace-cooled and removed from the furnace. It was found that the resulting body was integral and, of course, of essentially the same composition throughout. The joint between the two parts was integral and free of cracks and pores.

Although the present invention has been described in connection with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What I claim as new and desire to secure by Letters Patent of the United States is:

1. A method for joining ceramic bodies of the same composition having the same component parts, each body being composed of a metal oxide selected from the group consisting of aluminum oxide, magnesium oxide, beryllium oxide or combinations thereof, comprising assembling mating surfaces of the bodies in conjoint relationship defining a juncture surface, applying a continuous coating of not more than about 100 mils thickness of a powder having the same composition and the same component parts as the ceramic bodies to one of the mating surfaces prior to assembly, exerting pressure on the bodies to compress the powder coating at the juncture surface, and firing the assembled bodies at a temperature of from about 1800° C. to 1900° C. in a hydrogen atmosphere having a dew point not higher than about −40° F. for times not less than about 100 minutes to form an integral joint therebetween.

2. A method for joining ceramic bodies of the same composition having the same component parts, each body being composed of a metal oxide selected from the group consisting of aluminum oxide, magnesium oxide, beryllium oxide, or combinations thereof, comprising assembling mating surfaces of the bodies in conjoint relationship defining a juncture surface, applying a continuous coating of a powder having the same composition and the same component parts as the ceramic bodies to one of the mating surfaces prior to assembly, exerting pressure on the bodies to compress the powder coating at the juncture surface, subjecting the bodies to an initial firing while maintaining the pressure thereon at a temperature not less than about 1600° C. for times not less than about 10 minutes, and subjecting the assembled bodies to further firing at temperatures of from about 1700° C. to 1900° C. for times not less than about 100 minutes in a hydrogen atmosphere having a dew point no higher than about −40° F. to complete joining thereof.

References Cited by the Examiner

UNITED STATES PATENTS

| | | | |
|---|---|---|---|
| 2,212,556 | 8/1940 | Baier | 65—32 X |
| 2,248,644 | 7/1941 | Reger et al. | 65—43 |
| 2,279,168 | 4/1942 | Kalischer et al. | 65—32 |
| 2,620,598 | 12/1952 | Jobling-Purser et al. | 65—43 |
| 2,667,427 | 1/1954 | Nolte | 65—32 X |
| 2,749,668 | 6/1956 | Chaffotte et al. | 65—43 |
| 2,889,952 | 6/1959 | Claypool | 65—33 X |
| 3,023,492 | 3/1962 | Bristow | 65—43 X |
| 3,025,204 | 3/1962 | Heintz | 65—43 X |
| 3,184,370 | 5/1965 | Luks | 65—43 X |

DONALL H. SYLVESTER, *Primary Examiner.*

F. W. MIGA, *Assistant Examiner.*